US012107838B1

(12) United States Patent
Silva et al.

(10) Patent No.: US 12,107,838 B1
(45) Date of Patent: *Oct. 1, 2024

(54) PROTECTING AGAINST A TRACKING PARAMETER IN A WEB LINK

(71) Applicant: Gen Digital Inc., Tempe, AZ (US)

(72) Inventors: David Luz Silva, Dublin (IE); Iskander Sanchez Rola, Antibes (FR)

(73) Assignee: GEN DIGITAL INC., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,681

(22) Filed: Aug. 23, 2023

Related U.S. Application Data

(63) Continuation of application No. 17/356,987, filed on Jun. 24, 2021, now Pat. No. 11,777,908.

(51) Int. Cl.
*H04L 9/40* (2022.01)
*G06F 21/55* (2013.01)

(52) U.S. Cl.
CPC ........ *H04L 63/0414* (2013.01); *G06F 21/552* (2013.01); *G06F 2221/2149* (2013.01)

(58) Field of Classification Search
CPC ............... H04L 63/0414; G06F 21/552; G06F 2221/2149
See application file for complete search history.

(56) References Cited

U.S. PATENT DOCUMENTS 8,898,137 B1 * 11/2014 Brundage ........... G06F 16/9566
707/708
11,366,903 B1  6/2022 Savant et al.
11,595,420 B2  2/2023 Sanchez et al.
(Continued)

FOREIGN PATENT DOCUMENTS

CN     12541136 A    3/2021
WO  2015/007231 A1   1/2015

OTHER PUBLICATIONS

Ismael Castell-Uroz • Kensuke Fukuda • Pere Barlet-Ros; ASTrack: Automatic Detection and Removal of Web Tracking Code with Minimal Functionality Loss; IEEE Infocom 2023—IEEE Conference on Computer Communications (2023, pp. 1-10); (Year: 2023).*
Tomasz Bujlow • Valentin Carela-Espanol • Beom-Ryeol Lee • Pere Barlet-Ros; A Survey on Web Tracking: Mechanisms, Implications, and Defenses; Proceedings of the IEEE (vol. 105, Issue: 8, 2017, pp. 1476-1510); (Year: 2017).*

(Continued)

*Primary Examiner* — Luu T Pham
*Assistant Examiner* — Chao Wang
(74) *Attorney, Agent, or Firm* — MASCHOFF BRENNAN

(57) ABSTRACT

Protecting against a tracking parameter in a web link. In one embodiment, a method may include receiving an input URL during a browser navigation session on a user device, the input URL including parameters, determining that the parameters include a tracking parameter, pausing the browser navigation session on the user device, launching the input URL in a headless browser that operates in an isolated environment that simulates one or more features of the user device, landing on a destination web page in the isolated environment, identifying a URL of the destination web page as a destination URL, and resuming the browser navigation session on the user device by replacing the input URL, which includes the tracking parameter, with the destination URL, which does not include the tracking parameter, in order to protect the user device from the tracking parameter.

15 Claims, 4 Drawing Sheets

(56) References Cited

U.S. PATENT DOCUMENTS

| | | | |
|---|---|---|---|
| 2008/0177994 | A1 | 7/2008 | Mayer |
| 2011/0161260 | A1 | 6/2011 | Burges |
| 2012/0102545 | A1 | 4/2012 | Carter, III et al. |
| 2013/0110648 | A1 | 5/2013 | Raab |
| 2014/0172552 | A1 | 6/2014 | Raab |
| 2014/0278947 | A1 | 9/2014 | Raab |
| 2014/0324573 | A1 | 10/2014 | Raab |
| 2014/0358678 | A1 | 12/2014 | Raab |
| 2015/0032533 | A1 | 1/2015 | Raab |
| 2015/0288716 | A1 | 10/2015 | Emigh et al. |
| 2017/0093873 | A1* | 3/2017 | Beaulieu ............... H04L 63/083 |
| 2018/0039791 | A1 | 2/2018 | Beye |
| 2018/0039924 | A1 | 2/2018 | Beye |
| 2018/0039989 | A1 | 2/2018 | Beye |
| 2018/0075256 | A1* | 3/2018 | Robinson ............ H04L 63/1466 |
| 2019/0230070 | A1 | 7/2019 | Isaacson |
| 2019/0281059 | A1 | 9/2019 | Chittampally |
| 2019/0306137 | A1 | 10/2019 | Isaacson |
| 2020/0314136 | A1* | 10/2020 | Kang .................. H04L 63/1416 |
| 2020/0382480 | A1 | 12/2020 | Isaacson |
| 2021/0248203 | A1 | 8/2021 | Li |
| 2022/0053009 | A1 | 2/2022 | Sanchez |

OTHER PUBLICATIONS

Ismael Castell-Uroz • Theo Poissonnier • Pierre Manneback • Pere Barlet-Ros; URL-based Web Tracking Detection Using Deep Learning; 2020 16th International Conference on Network and Service Management (CNSM) (2020, pp. 1-5); (Year: 2021).*

Nortonlifelock; "Norton Safe Web feature: Link Guard"; Webpage; located at: https://ie.norton.com/feature/safe-web#linkguard; 2021; accessed on Jun. 22, 2021; 2 pages.

Kameleo; "Avoid browser fingerprining and use of virtual profiles"; Webpage; located at: https://www.producthunt.com/posts/kameleo; accessed on Jun. 22, 2021; 3 pages.

Google Developers; "Google Safe Browsing; Safe Browsing APIs (v4)—URLs and Hashing"; Webpage; located at: https://developers.google.com/safe-browsing/v4/urls-hashing; last updated Apr. 23, 2018; accessed on Jun. 22, 2021; 3 pages.

Github, Inc.; "Google/safebrowsing"; Webpage; located at: https://github.com/google/safebrowsing; 2021; accessed on Jun. 22, 2021; 2 pages.

Ruo Ando, Yuuki Takano, Shinsuke Miwal; "An empirical study of third party APK's URL using scriptable API and fast identifier-specific filter"; 2017 IEEE 9th International Conference on Communication Software and Networks (ICCSN); pp. 1501-1506.

Hyunsang Choi, Seongjin Hong, Sanghyun Cho, Young-Gab Kim; HXD: Hybrid XSS detection by using a headless browser; 2017; 4th International Conference on Computer Applications and Information Processing Technology (CAIPT); pp. 1-4.

Yuan Liu, Wenbing Zhao, Dan Wang, Lihua Fu; "A XSS Vulnerability Detection Approach Based on Simulating Browser Behavior"; 2015; 2nd International Conference on Information Science and Security (ICISS); pp. 1-4.

* cited by examiner

PROTECTING AGAINST A TRACKING PARAMETER IN A WEB LINK

CROSS REFERENCE TO RELATED APPLICATION

This application is a continuation of U.S. patent application Ser. No. 17/356,987, filed on Jun. 24, 2021, which application is incorporated herein by reference in its entirety.

BACKGROUND

During web browsing sessions, Internet users often encounter web links that are associated with universal resource locators (URLs). These links are often included in scripts that appear on one or more panels of a web page, but may also be embedded in the web page itself. Online advertisements are often presented to Internet users through these web links.

When a user selects (e.g., clicks on or taps on) a web link, the browser complies with the steps, or redirects, that are needed to arrive at a destination web page. Unfortunately, the URLs associated with these web links often include tracking parameters that are not necessary to arrive at a desired website. These tracking parameters may be used to silently contact one or more tracking domains during the redirection process. Once contacted, these tracking domains may create security issues for users by tracking the users' online movements and exposing their devices to various threats, including malware attacks, phishing attacks, etc. Therefore, while users may want to access web pages by selecting web links, it may be dangerous to select these links.

The subject matter claimed herein is not limited to embodiments that solve any disadvantages or that operate only in environments such as those described above. Rather, this background is only provided to illustrate one example technology area where some embodiments described herein may be practiced.

SUMMARY

As will be described in greater detail below, the present disclosure describes various systems and methods for protecting against a tracking parameter in a web link.

In one embodiment, a computer-implemented method for protecting against a tracking parameter in a web link may be performed, at least in part, by a computing device comprising one or more processors. The method may include receiving an input URL during a browser navigation session on a user device, the input URL including parameters, determining that the parameters include a tracking parameter, pausing the browser navigation session on the user device, launching the input URL in a headless browser, the headless browser operating in an isolated environment that simulates one or more features of the user device, in response to launching the input URL in the headless browser, landing on a destination web page in the isolated environment, identifying a URL of the destination web page as a destination URL, and resuming the browser navigation session on the user device by replacing the input URL, which includes the tracking parameter, with the destination URL, which does not include the tracking parameter, in order to protect the user device from the tracking parameter.

In some embodiments, the method may further include storing tracking data in a database, the tracking data including the input URL, the destination URL, and an identification of the tracking parameter within the input URL, receiving a second input URL during a second browser navigation session on the user device, the second input URL including second parameters, determining that the second parameters include the tracking parameter, pausing the second browser navigation session on the user device, determining that a second destination URL can be identified based on an evaluation of the second input URL, the evaluation of the second input URL including an analysis of the tracking data stored in the database, the determination of the second destination URL being based, at least in part, on an identification of the tracking parameter in the tracking data, and resuming the second browser navigation session on the user device by replacing the second input URL, which includes the tracking parameter, with the second destination URL, which does not include the tracking parameter, in order to protect the user device from the tracking parameter. In these embodiments, the analysis of the tracking data may include a statistical analysis that determines a number of times that the second parameters have been analyzed previously, in whole or in part, and a number of times that the tracking parameter has been identified.

In some embodiments, the destination URL may not be explicitly recited within the parameters of the input URL. In some embodiments, the simulated one or more features of the user device may include an operating system, a web browser, or a geolocation. In some embodiments, the launching of the input URL in the headless browser and the replacing of the input URL with the destination URL are performed by a security server that is remote from the user device.

Also, in some embodiments, one or more non-transitory computer-readable media comprising one or more computer-readable instructions that, when executed by one or more processors of a security device, cause the security device to perform a method for protecting against a tracking parameter in a web link.

Also, in some embodiments, a computing device comprising one or more processors and one or more non-transitory computer-readable media comprising one or more computer-readable instructions that, when executed by the one or more processors, may cause the computing device to perform a method for protecting against a tracking parameter in a web link.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
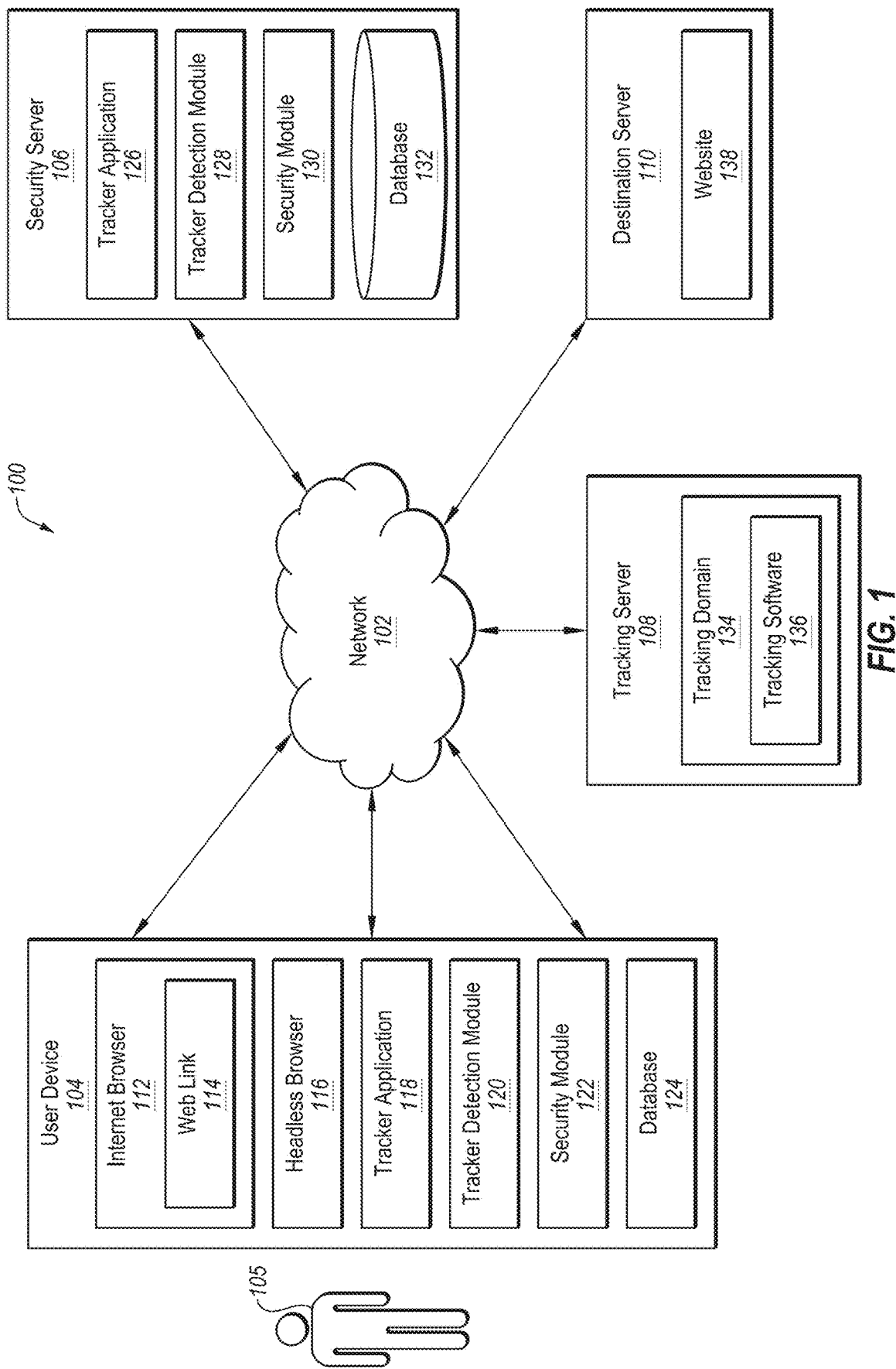
FIG. 1 illustrates an example system configured for protecting against a tracking parameter in a web link.

Web links, frequently contained in online advertisements, are often presented to users during Internet browsing sessions. These web links are associated with URLs that often contain a variety of paraments. These paraments may include not only a destination parameter, or the portion of the URL that identifies a destination web page, but may also include one or more tracking parameters. These tracking parameters may be used to silently contact one or more tracking domains during a redirection process after a selection of the web link. The term "tracking domains," as used herein, includes domains that track users' online movements as well as domains that are configured to deliver harmful software, such as malware, to a user device. Once contacted, these tracking domains may create security issues for users by tracking users' online movements and exposing their devices to various threats, including malware attacks, phishing attacks, etc.

In order to avoid these tracking domains, a URL associated with a web link may be evaluated and a user may be alerted when a tracking parameter exists within the URL of a web link that the user has selected. The user may then be presented with several options on how to proceed. The user may ignore the alert and visit the desired web page, thus allowing the tracking domain(s) to be contacted. Alternatively, the user may elect to not visit the desired link. Neither of these options are ideal for users that want to safely visit web pages that are presented in web links.

Some embodiments disclosed herein may enable a user to visit a web page associated with a web link in a way that does not expose the user's device to any security issues. In particular, some embodiments may protect a computing device against a tracking parameter that is contained within a web link. For example, during a browser navigation session on a user device, a user may select a web link that is associated with a particular URL (or "input URL"). The input URL may include a plurality of parameters. In addition to a destination parameter, the input URL may also contain a tracking parameter. A determination may be made that these parameters include at least one tracking parameter. For example, U.S. patent application Ser. No. 16/991,985, the disclosure of which is hereby incorporated by reference in its entirety, describes ways in which a tracking parameter within a URL may be identified.

Once a tracking parameter is identified, the browser navigation session on the user device may be paused. The input URL may be launched in a headless browser. The headless browser may operate in an isolated environment that simulates one or more features of the user device. In response to launching the input URL in the headless browser, the headless browser may land on a destination web page in the isolated environment. The URL of this destination page (or "destination URL") may be identified as a destination URL. The browser navigation session may then be resumed on the user device by replacing the input URL, which includes the tracking parameter, with the destination URL, which does not include the tracking parameter, in order to protect the user device from the tracking parameter.

In this manner, a user can arrive safely at a destination URL without being redirected through a tracking domain that is associated with a tracking parameter present in an input URL. By avoiding these tracking domains, the user's device may be protecting from the security issues that may arise from the user's online movements being tracked, and security threats, such as malware attacks, phishing attacks, etc.

Turning to the figures, FIG. 1 illustrates an example system configured for protecting against a tracking parameter in a web link. The system 100 may include a network 102, a user device 104 and an associated user 105, a security server 106, a tracking server 108, and a destination server 110.

In some embodiments, the network 102 may be configured to communicatively couple the user device 104, the security server 106, the tracking server 108, and the destination server 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
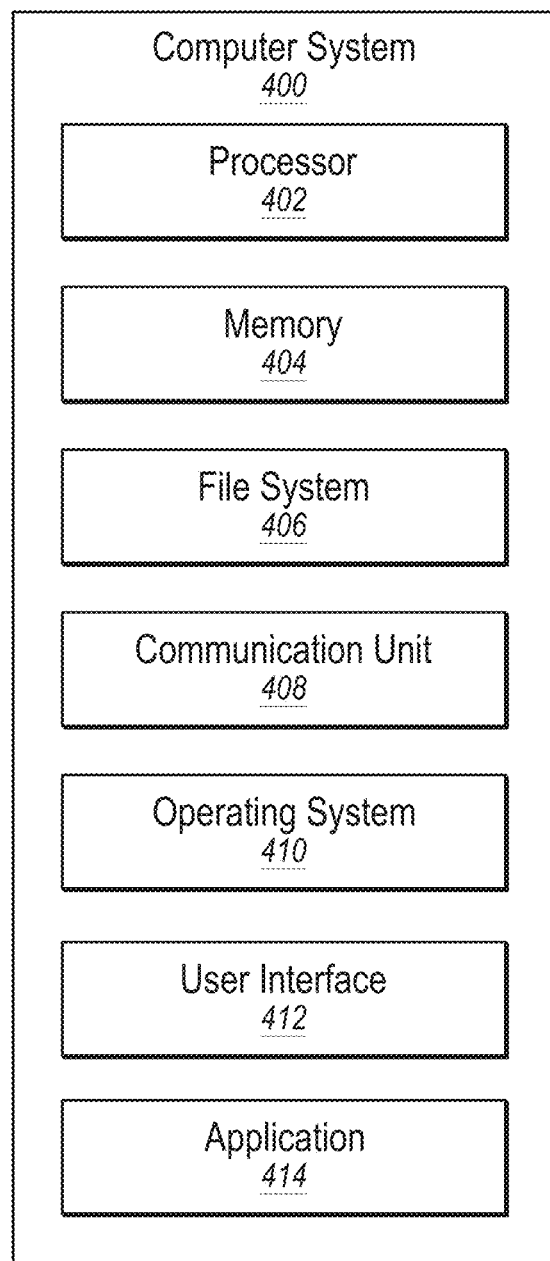
FIG. 4 illustrates an example computer system that may be employed in protecting against a tracking parameter in a web link.

In some embodiments, the user device 104 may be any computer system capable of communicating over the network 102, examples of which are disclosed herein in connection with the computer system 400 of FIG. 4. In some embodiments, the user device 104 may include an Internet browser 112. The Internet browser 112 may facilitate access by the user 105 to websites on the Internet. One or more of these websites may include and display a web link 114. The web link 114 may be associated with a URL address that may enable the user 105 to visit a desired web page when the user 105 selects the web link 114. The URL address associated with the web link 114, or the input URL, may include a plurality of parameters. These parameters may include a destination parameter and one or more tracking parameters.

The destination parameter may include the portion of the input URL that directs the web browser to the destination web page that is associated with the web link 114. In some embodiments, the destination parameter may explicitly recite the URL of the destination web page, or destination URL. In other embodiments, the destination URL may be implicitly contained within the URL associated with the web link. The one or more tracking parameters may be associated with tracking domains. If these tracking parameters are not removed, the Internet browser 112 may be redirected through these tracking domains before arriving at the destination web page.

In some embodiments, the user device 104 may also include a headless browser 116. The headless browser 116 may be implemented in connection with a security module 122, as provided in more detail hereafter. In some embodiments, the user device 104 may also include a tracker application 118. The tracker application 118 may facilitate communications between the user device 104 and the security server 106. In some embodiments, the user device 104 may also include a tracker detection module 120. The tracker detection module 120 may be configured to determine whether a URL address associated with the web link 114, which is selected by the user 105 during a browser navigation session on the Internet browser 112, includes one or more tracking parameters. In some embodiments, the user device 104 may include a security module 122. As discussed in more detail below in connection with FIG. 2, the security module 122 may be configured to identify, from an input URL that includes one or more tracking parameters, a destination URL that does not include any tracking parameters. Finally, in some embodiments, the user device 104 may include a database 124.

In some embodiments, the security server 106 may be any computer system capable of communicating over the network 102, examples of which are disclosed herein in connection with the computer system 400 of FIG. 4. In some embodiments, the security server 106 may include a tracker application 126. The tracker application 126 may facilitate communications between the security server 106 and the user device 104. In some embodiments, the security server 106 may include a tracker detection module 128. The tracker detection module 128 may be configured to determine whether a URL address that is associated with a web link accessed by the user 105 during a browsing session on the Internet browser 112, includes one or more tracking parameters. In some embodiments, the security server 106 may include a security module 130. As discussed in more detail below in connection with FIG. 2, the security module 130 may be configured to identify, from an input URL having one or more tracking parameters, a destination URL that does not include any tracking parameters. Finally, in some embodiments, the security server 106 may include a database 132.

In some embodiments, the tracking server 108 may be any computer system capable of communicating over the network 102, examples of which are disclosed herein in connection with the computer system 400 of FIG. 4. In some embodiments, the tracking server 108 may include a tracking domain 134. Tracking domain 134 may be associated with a tracking parameter that is contained within an input URL, such that the Internet browser 112 is redirected through the tracking domain 134 before arriving at a destination web page. In some embodiments, the tracking domain 134 may include a tracking software 136, which may be used to compromise the security of the user device 104. For example, the tracking software 136 may be used to track the online movements of the user 105 and/or expose the user device 104 to various threats including malware attacks, phishing attacks, etc.

In some embodiments, the destination server 110 may be any computer system capable of communicating over the network 102, examples of which are disclosed herein in connection with the computer system 400 of FIG. 4. In some embodiments, the destination server 110 may include a website 138. The website 138 may include a web page that is the intended destination of the user 105 after selecting the web link 114.

In some embodiments the user 105 may be navigating the Internet using the Internet browser 112 on the user device 104. The user 105 may encounter the web link 114 and decide that he or she would like to visit a web page that is associated with the web link 114. Upon selecting the web link 114, a tracker detection module may evaluate the URL associated with the web link 114 as an input URL to determine whether it includes any tracking parameters. The tracker detection module may be local to the user device 104 (as is the case with the tracker detection module 120) or the tracker detection module may be remote from the user device 104 (as is the case with the tracker detection module 128, which is in the security server 106). In embodiments where the tracker detection module is remote from the user device 104, the user device 104 may transmit the input URL using the tracker application 118. For example, user device 104 may transmit the input URL to the tracker detection module 128 in security server 106 using the tracker application 118. The security server 106 may receive the input URL through the tracker application 126.

If the tracker detection module determines that the input URL includes a tracking parameter, the browser navigation session may be paused, and a security module may receive the input URL. As with the tracker detection module, the security module may be local to the user device 104 (as is the case with the security module 122) or the security module may be remote from the user device 104 (as is the case with the security module 130, which is in the security server 106). The security server may identify a URL of the destination web page as a destination URL. Once identified, the security module may resume the browser navigation session on the Internet browser 112 by replacing the input URL, which includes the tracking parameter, with the destination URL, which does not include the tracking parameter, in order to protect the user device 104 from the tracking parameter. The destination URL may be associated with a web page at website 138 of destination server 110.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
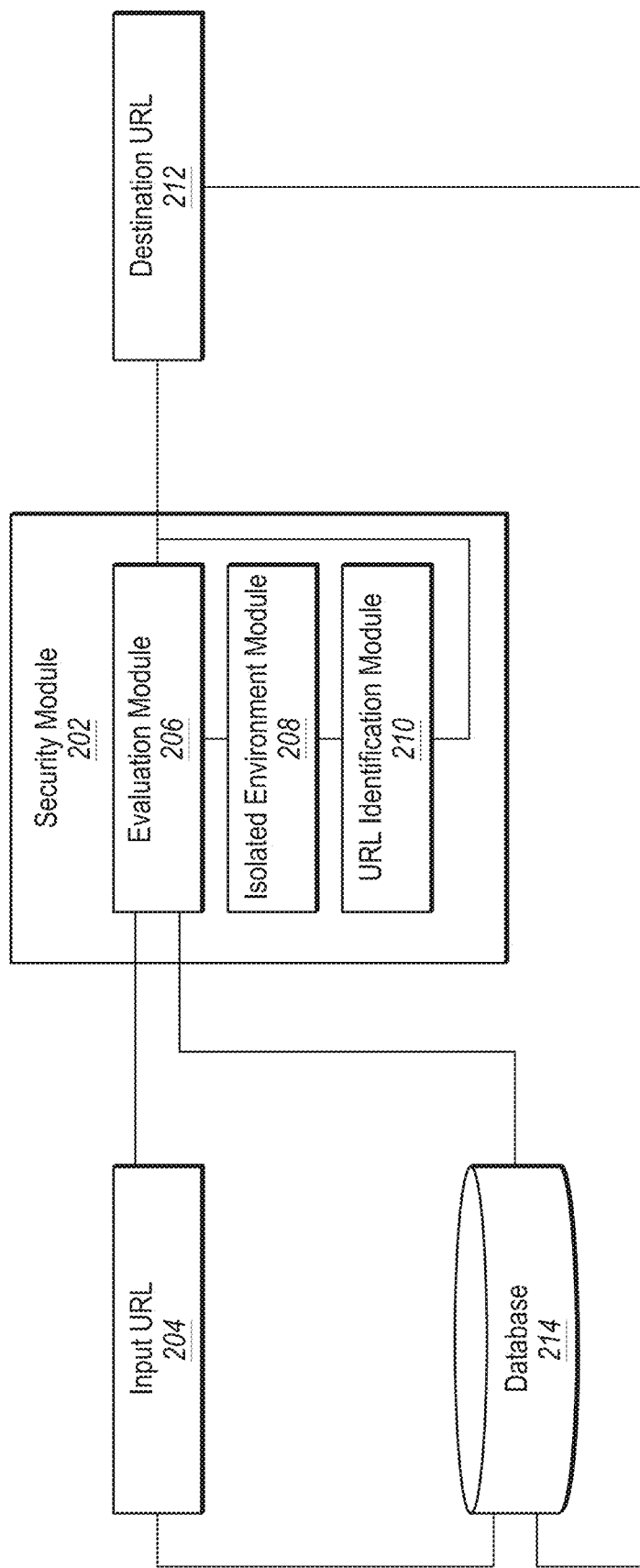
FIG. 2 illustrates an exemplary security module.

FIG. 2 illustrates an exemplary security module 202. The security module 202 may be installed and run locally from a user device. For example, the security module 202 could be implemented as the security module 122 in the user device 104 illustrated in FIG. 1. Alternatively, the security module 202 may run from a security server that is remote from a user device. For example, the security module 202 could be implemented as the security module 130 in the security server 106 illustrated in FIG. 1. As disclosed in FIG. 2, the security module 202 may include an evaluation module 206, an isolated environment module 208, and a URL identification module 210.

Prior to its arrival at the security module 202, a determination may be made that in addition to a destination parameter, the input URL 204 also includes at least one tracking parameter. For example, the tracker detection module 120 of user device 104 or the tracker detection module 128 of the security server 106 may have determined that the input URL 204 includes at least one tracking parameter. The security module 202 may receive the input URL 204 and output a destination URL 212. For example, the input URL 204 may be associated with the web link 114 that the user 105 selects during a browser navigation session on the Internet browser 112 and the destination URL may be associated with a web page at website 138 in FIG. 1.

In some embodiments, the destination URL 212 may be explicitly recited in the input URL 204, such that the destination URL 212 is just the destination parameter within the input URL. In other embodiments, however, the destination URL may not be explicitly recited within the parameters of the input URL. For example, the destination URL may be implicitly identified through one or more parameter values within the input URL.

Upon receipt of the input URL 204 at the security module 202, the evaluation module 206 may first analyze the parameters of the input URL 204 to determine whether a destination URL can be determined based on an evaluation of the parameters of the input URL 204. The evaluation module 206 may access a database 214 that contains tracking data. This tracking data may include data relating to URLs associated with web links. For example, the tracking data may include previously analyzed input URLs, their corresponding destination URLs, and an identification of the tracking and destination parameters within the input URLs. The database may be in a user device, such as database 122 in user device 104 or the database may be in a server that is remote from a user device, such as database 130 in security server 106.

In one embodiment, the evaluation module 206 may perform a statistical analysis of the tracking data within the database 214. For example, the evaluation module 206 may analyze how many times each parameter within the input URL 204 has been evaluated previously. The evaluation module 206 may consider how many times a parameter within the input URL 204 has been found to be a tracking parameter and how many times a parameter within the input URL 204 has be found to be a destination parameter. The evaluation module 206 may also consider the source of the web link (for example, a Google Ad) and any information that is unique to the web link source, such as pattern matching. For example, the evaluation module 206 may determine that in 90% of Google Ad web links, the destination URL is the last parameter that appears in the input URL.

The evaluation module 206 may require a certain degree or threshold amount of confidence that it has accurately determined the destination URL from the input URL. If the evaluation module 206 has identified a destination URL by the required amount of confidence, the security module 202 may output this as the destination URL. Once output as the destination URL, the security module 202 may resume the browser navigation session of the user 105 by replacing, in the Internet browser 112, the input URL 204 (which includes the tracking parameter) with the destination URL 212 (which does not include the tracking parameter) in order to protect the user device 104 from the tracking parameter.

If the evaluation module 206 has not identified a destination URL by the required amount of confidence, an isolated environment module 208 may simulate one or more features of a user device, such as the user device 104. The isolated environment module 208 may also randomize one or more other features of the user device 104 so that the user device 104 is not entirely replicated within the isolated environment. For example, the isolated environment module 208 may simulate the operating system, web browser, geo-location, or other features of the user device 104, and randomize features such as screen size, user-agent string, browser version, etc. Once the user device 104 has been simulated in an isolated environment, the input URL 204 may be launched in a headless browser, such as the headless browser 116, in the isolated environment. The headless browser 116 may be a browser that lacks a digital user interface. Launching the input URL in a headless browser within an environment that simulates a user device may protect the user device from any malicious tracking domains that the headless browser may visit during the redirection process.

Once the input URL 204 has been launched in the headless browser, a URL identification module 210 may identify the URL of the web page where the input URL 204 lands after the redirection process to be the destination URL 212. After identifying the destination URL 212, the security module 202 may resume the browser navigation session of the user 105 by replacing, in the Internet browser 112, the input URL (which includes the tracking parameter) with the destination URL (which does not include the tracking parameter) in order to protect the user device 104 from the tracking parameter. The input URL 204 and the destination URL 212, along with an identification of the tracking and destination parameters, may also be stored within the database 214.

Security module 202 is therefore able safely identify, and serve back to an Internet browser, a destination URL that lacks all tracking parameters for any web links that are selected by a user during a browser navigation session. Thus, when tracking parameters are identified in a URL associated with a web link selected by a user during a navigation session, the security module 202 may provide the user with an additional option to visit the desired web page without being redirected through any potentially malicious tracking domains.

Modifications, additions, or omissions may be made to the security module 202 without departing from the scope of the present disclosure. For example, the security module 202 may include additional components similar to the components illustrated in FIG. 2 that each may be configured similarly to the components illustrated in FIG. 2. Further, in some embodiments, the functionality of the security module 202 may be spread across two or more separate security modules. For example, in some embodiments, a security module located in a first remote security server may perform the function of the evaluation module 206 and a security module located in either a user device or a second remote security server may perform the functions of the isolated environment module 208 and the URL identification module 210.

Figure 3:
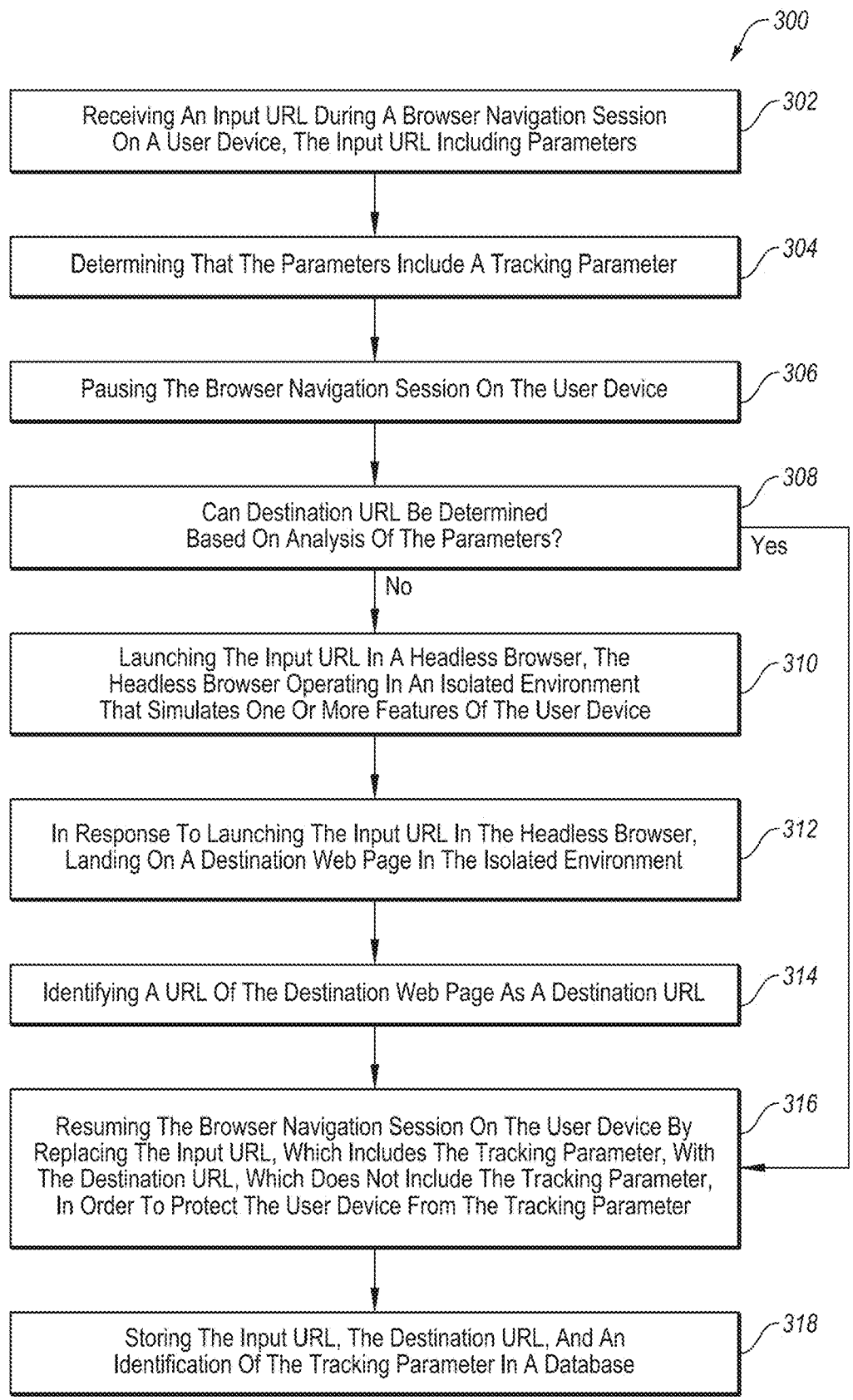
FIG. 3 illustrates a flowchart of an example method for protecting against a tracking parameter in a web link.

FIG. 3 is a flowchart of an example method 300 for protecting against a tracking parameter in a web link. The method 300 may be performed, in some embodiments, by one or more devices, systems, or modules. For example, method 300 may be performed by the tracker detection modules 120 or 128 of FIG. 1, and either the security modules 122 or 130 of FIG. 1 or security module 202 of FIG. 2. In these and other embodiments, the method 300 may be performed by one or more processors based on one or more computer-readable instructions stored on one or more non-transitory computer-readable media. The method 300 will now be described in connection with FIGS. 1 and 2.

The method 300 may include, at action 302, receiving an input URL during a browser navigation session on a user device. For example, the input URL may correspond to the web link 114 that the user 105 selects during a browser navigation session on the Internet browser 112. The input URL may include a plurality of parameters. The method 300 may include, at action 304, determining that the parameters include a tracking parameter and, at action 306, pausing the browser navigation session on the user device.

The method 300 may include, at action 308, evaluating whether a destination URL can be determined based on an evaluation of the parameters. In some embodiments, the destination URL may be explicitly recited in a destination parameter of the input URL. In other embodiments, the destination URL may not be explicitly recited in the parameters of the input URL. For example, the destination URL may only be implicitly included in one or more value parameters of the input URL.

In one embodiment, the evaluation of the input URL may include an analysis of tracking data stored in a database. The determination of the destination URL may be based, at least in part, on an identification of the tracking parameter in the tracking data. The analysis of the tracking data may include a statistical analysis of the tracking data. For example, the statistical analysis may determine a number of times that the parameters have been analyzed previously, in whole or in part, and a number of times that the tracking parameter has been identified. The evaluation of the input URL may also include an identification of the type of web link that is associated with the input URL and any data corresponding to the particular type of web link being analyzed. For example, the web link may be identified as a Google Ad. The tracking data may confirm that in a high percentage of instances, the destination parameter appears as the last parameter in the input URL. A determination that a destination URL can be determined based on an analysis of the parameters may require a certain level of confidence or a threshold level of certainty. If the level of certainty or confidence is met, the method 300 may proceed to action 316, where the browser navigation session on the user device is resumed by replacing the input URL, which includes the tracking parameter, with the destination URL, which does not include the tracking parameter, in order to protect the user device from the tracking parameter.

If the level of certainty or confidence is not met, the method 300 may include, at action 310, launching the input URL in a headless browser. The headless browser may operate in an isolated environment that simulates one or more features of the user device. For example, the simulated features of the user device may include an operating system, a web browser, a geolocation, or another feature of the simulated user device. The isolated environment may randomize other features of the user device such as screen size, user-agent string, browser version, etc. such that the isolated environment in which the headless browser operates does not entirely replicate the user device. In some embodiments, the headless browser may lack a digital user interface.

The method 300 may include, at action 312, in response to launching the input URL in the headless browser, landing on a destination web page in the isolated environment. The destination web page may be the web page that the user intended to access by selecting the web link. Launching the input URL in a headless environment within a simulated environment may protect the user device from any malicious tracking domains that an Internet browser may visit during the redirection process.

The method 300 may include, at action 314, identifying a URL of the destination web page as a destination URL and, at action 316, resuming the browser navigation session on the user device by replacing the input URL, which includes the tracking parameter, with the destination URL, which does not include the tracking parameter, in order to protect the user device from the tracking parameter.

Finally, the method 300 may include, at action 318, storing the input URL and the destination URL in the database, along with an identification of the tracking and destination parameters. This database may be the same database that was accessed during the analysis of the parameters in the input URL in step 308. By storing input URLs and destination URLs in the database, additional data may be included in future evaluations of similar parameters in selected web links.

The method 300 may thus be employed, in some embodiments, to replace an input URL, which includes one or more tracking parameter, with a destination URL, which lacks tracking parameters, during a browser navigation session on the Internet. By avoiding tracking parameters, computing devices may be protected from malicious tracking domains, which may be unwittingly visited during a redirection process.

Although the actions of the method 300 are illustrated in FIG. 3 as discrete actions, various actions may be divided into additional actions, combined into fewer actions, reordered, expanded, or eliminated, depending on the desired implementation. For example, in some embodiments, actions 308 and 318 may be skipped. In this embodiment, all input URLs that have been determined to include a tracking parameter may be launched in a headless browser as recited in action 310.

Further, it is understood that the method 300 may improve the functioning of a computer system itself. For example, the functioning of a computing device that performs the steps recited in method 300 may be improved by avoiding the tracking domains associated with tracking parameters in an input URL. These tracking domains may track a user's movements on the computer system, install malicious software, or otherwise compromise the functionality of the computing device by making the computing device vulnerable to threats, such as malware attacks, phishing attacks, etc.

FIG. 4 illustrates an example computer system 400 that may be employed in protecting against a tracking parameter in a web link. In some embodiments, the computer system 400 may be part of any of the systems or devices described in this disclosure. For example, the computer system 400 may be part of any of the user device 104, the server device 106, the tracking server 108, the destination server 110 of FIG. 1 and the security module 202 of FIG. 2.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the tracker applications 118 and 126 in FIG. 1, or any of the modules in FIGS. 1 and 2, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as any one of the applications, such as the tracker applications 118 and 126 in FIG. 1, or any of the modules in FIGS. 1 and 2, or in some combination thereof.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general-purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting against a tracking parameter in a web link, at least a portion of the method being performed by a computing device comprising one or more processors, the computer-implemented method comprising:
   receiving an input uniform resource locator (URL) during a browser navigation session on a user device, the input URL including parameters that are configured to direct a web browser to a destination web page;
   determining, from the URL, that the parameters include (i) a destination parameter that corresponds to the destination web page and (ii) a tracking parameter that corresponds to a tracking domain configured to track online movements and/or deliver harmful software to the user device;
   pausing the browser navigation session on the user device;
   launching the input URL in a headless browser, the headless browser operating in an isolated environment that simulates one or more features of the user device, wherein the simulated one or more features of the user device include an operating system, a web browser, or a geolocation;
   in response to launching the input URL in the headless browser, landing on the destination web page in the isolated environment;
   identifying the destination parameter that corresponds to the destination web page as a destination URL; and
   resuming the browser navigation session on the user device by replacing the input URL, which includes the tracking parameter, with the destination URL that does not include the tracking parameter, in order to protect the user device from the tracking parameter.

2. The computer-implemented method of claim 1, further comprising storing tracking data in a database, the tracking data including the input URL, the destination URL, and an identification of the tracking parameter within the input URL.

3. The computer-implemented method of claim 2, further comprising:
   receiving a second input URL during a second browser navigation session on the user device, the second input URL including second parameters;
   determining that the second parameters include the tracking parameter;
   pausing the second browser navigation session on the user device;
   determining that a second destination URL can be identified based on an evaluation of the second input URL, the evaluation of the second input URL including an analysis of the tracking data stored in the database, the determination of the second destination URL being based, at least in part, on an identification of the tracking parameter in the tracking data; and
   resuming the second browser navigation session on the user device by replacing the second input URL, which includes the tracking parameter, with the second destination URL, which does not include the tracking parameter, in order to protect the user device from the tracking parameter.

4. The computer-implemented method of claim 3, wherein the analysis of the tracking data includes a statistical analysis that determines a number of times that the second parameters have been analyzed previously, in whole or in part, and a number of times that the tracking parameter has been identified.

5. The computer-implemented method of claim 1, wherein the launching of the input URL in the headless browser and the replacing of the input URL with the destination URL are performed by a security server that is remote from the user device.

6. One or more non-transitory computer-readable media comprising one or more computer-readable instructions that, when executed by one or more processors of a security device, cause the security device to perform a method for protecting against a tracking parameter in a web link, the method comprising:
   receiving an input uniform resource locator (URL) during a browser navigation session on a user device, the input URL including parameters that are configured to direct a web browser to a destination web page;
   determining, from the URL, that the parameters include (i) a destination parameter that corresponds to the destination web page and (ii) a tracking parameter that corresponds to a tracking domain configured to track online movements and/or deliver harmful software to the user device;
   pausing the browser navigation session on the user device;
   launching the input URL in a headless browser, the headless browser operating in an isolated environment that simulates one or more features of the user device, wherein the simulated one or more features of the user device include an operating system, a web browser, or a geolocation;
   in response to launching the input URL in the headless browser, landing on the destination web page in the isolated environment;
   identifying the destination parameter that corresponds to the destination web page as a destination URL; and resuming the browser navigation session on the user device by replacing the input URL, which includes the tracking parameter, with the destination URL that does not include the tracking parameter, in order to protect the user device from the tracking parameter.

7. The one or more non-transitory computer-readable media of claim 6, further comprising storing tracking data in a database, the tracking data including the input URL, the destination URL, and an identification of the tracking parameter within the input URL.

8. The one or more non-transitory computer-readable media of claim 7, further comprising:
receiving a second input URL during a second browser navigation session on the user device, the second input URL including second parameters;
determining that the second parameters include the tracking parameter;
pausing the second browser navigation session on the user device;
determining that a second destination URL can be identified based on an evaluation of the second input URL, the evaluation of the second input URL including an analysis of the tracking data stored in the database, the determination of the second destination URL being based, at least in part, on an identification of the tracking parameter in the tracking data; and
resuming the second browser navigation session on the user device by replacing the second input URL, which includes the tracking parameter, with the second destination URL, which does not include the tracking parameter, in order to protect the user device from the tracking parameter.

9. The one or more non-transitory computer-readable media of claim 8, wherein the analysis of the tracking data includes a statistical analysis that determines a number of times that the second parameters have been analyzed previously, in whole or in part, and a number of times that the tracking parameter has been identified.

10. The one or more non-transitory computer-readable media of claim 6, wherein the launching of the input URL in the headless browser and the replacing of the input URL with the destination URL are performed by a security server that is remote from the user device.

11. A computing device comprising:
one or more processors; and
one or more non-transitory computer-readable media comprising one or more computer-readable instructions that, when executed by the one or more processors, cause the computing device to perform a method for protecting against a tracking parameter in a web link, the method comprising:
receive an input uniform resource locator (URL) during a browser navigation session on a user device, the input URL including parameters that are configured to direct a web browser to a destination web page;
determine, from the URL, that the parameters include (i) a destination parameter that corresponds to the destination web page and (ii) a tracking parameter that corresponds to a tracking domain configured to track online movements and/or deliver harmful software to the user device;
pausing the browser navigation session on the user device;
launching the input URL in a headless browser, the headless browser operating in an isolated environment that simulates one or more features of the user device, wherein the simulated one or more features of the user device include an operating system, a web browser, or a geolocation;
in response to launching the input URL in the headless browser, landing on the destination web page in the isolated environment;
identifying the destination parameter that corresponds to the destination web page as a destination URL; and
resuming the browser navigation session on the user device by replacing the input URL, which includes the tracking parameter, with the destination URL that does not include the tracking parameter, in order to protect the user device from the tracking parameter.

12. The computing device of claim 11, further comprising storing tracking data in a database, the tracking data including the input URL, the destination URL, and an identification of the tracking parameter within the input URL.

13. The computing device of claim 12, further comprising:
receiving a second input URL during a second browser navigation session on the user device, the second input URL including second parameters;
determining that the second parameters include the tracking parameter;
pausing the second browser navigation session on the user device;
determining that a second destination URL can be identified based on an evaluation of the second input URL, the evaluation of the second input URL including an analysis of the tracking data stored in the database, the determination of the second destination URL being based, at least in part, on an identification of the tracking parameter in the tracking data; and
resuming the second browser navigation session on the user device by replacing the second input URL, which includes the tracking parameter, with the second destination URL, which does not include the tracking parameter, in order to protect the user device from the tracking parameter.

14. The computing device of claim 13, wherein the analysis of the tracking data includes a statistical analysis that determines a number of times that the second parameters have been analyzed previously, in whole or in part, and a number of times that the tracking parameter has been identified.

15. The computing device of claim 11, wherein the launching of the input URL in a headless browser and the replacing of the input URL with the destination URL are performed by a security server that is remote from the user device.

* * * * *